United States Patent
Smith et al.

4,059,707
Nov. 22, 1977

[54] METHOD OF FILLING APERTURES WITH CRYSTALLINE MATERIAL

[75] Inventors: Roland Wright Smith; Arnold Robert Moore, both of Princeton, N.J.

[73] Assignee: RCA Corporation, New York, N.Y.

[21] Appl. No.: 609,005

[22] Filed: Aug. 29, 1975

[51] Int. Cl.² .............................................. B05D 3/06
[52] U.S. Cl. .................. 427/35; 350/96 BC; 427/53; 427/55; 427/65; 427/376 R
[58] Field of Search ............ 427/35, 53, 55, 375, 427/376 A, 376 B, 376 C, 376 D, 376 E, 376 F, 376 G, 376 H, 97, 290, 65; 428/118, 117, 116, 131; 350/96 BC, 96 LM

[56] References Cited

U.S. PATENT DOCUMENTS

| 3,240,105 | 3/1966 | Woodcock et al. | 350/96 BC |
| 3,562,009 | 2/1971 | Cranston et al. | 427/53 |
| 3,773,549 | 11/1973 | Elbert et al. | 427/376 C |
| 3,837,909 | 9/1974 | Menelly | 427/376 C |
| 3,911,167 | 10/1975 | Linder | 427/376 A |

*Primary Examiner*—John H. Newsome
*Attorney, Agent, or Firm*—Glenn H. Bruestle; George E. Haas

[57] ABSTRACT

A sheet containing the apertures to be filled is coated with a layer of crystalline material. A localized heat source heats small portions of the layer at a time. The crystalline material in each portion is melted and allowed to flow into the apertures. The localized heat source is then moved to heat a different portion of the crystalline layer. In this fashion the layer of crystalline material is scanned with the localized heat source so that the crystalline material melts, flows into the apertures to be filled and then recrystallizes.

9 Claims, 3 Drawing Figures

METHOD OF FILLING APERTURES WITH CRYSTALLINE MATERIAL

BACKGROUND OF THE INVENTION

The present invention relates to methods for filing apertures with crystalline material and specifically to the filling of a plurality of apertures in a single sheet.

Various radiation conversion screens, such as those which convert x-rays to visible light, are fabricated by forming an array of apertures in a glass sheet. These apertures are then filled with a phosphorescent material which will convert the x-rays to visible light. The phosphorescent material in each aperture must be as optically transparent as possible to enable the light generated within the aperture to radiate from the phosphorescent material. It is most desirable, therefore, that the phosphorescent material in each aperture have as close as a single crystalline structure as possible since any non-uniformity in the structure will impede the light transmission. When the phosphorescent material has a higher index of refraction than the glass sheet, each filled aperture forms a fiber optic element. This procedure for fabricating the conversion screen permits the sheet thickness and the element diameter to be selected for optimum resolution and sensitivity.

Recent technological advances have made it possible to form a glass sheet having a matrix of extremely small apertures. For example, glass sheets having a matrix of closely packed holes each ten microns in diameter are readily available. However, difficulty has been encountered when conventional manufacturing techniques were used to fill the tiny apertures with phosphorescent material. Heretofore, the phosphorescent material was melted on the sheet's surface by heating the entire sheet. Capillary action then drew the material into the apertures. Because of the relatively small size of the apertures, the molten crystalline material is rapidly cooled as it flows into each aperture and recrystallizes before the entire aperture is filled. When large screens are made, the filling is further complicated by temperature gradients across the sheet's surface. The molten crystalline material tends to flow to the cooler sections of the sheet resulting in an unequal filling of the apertures.

SUMMARY OF THE INVENTION

A plurality of tiny apertures in a sheet of material may be filled with crystalline material by first coating one surface of the sheet with a layer of the crystalline material. The layer is then heated with a localized heat source so that a portion of the layer melts and flows into the apertures. The layer is scanned by the localized heat source so that the crystalline material flows into all of the apertures to be filled.

DETAILED DESCRIPTION OF THE INVENTION

Figure 1:
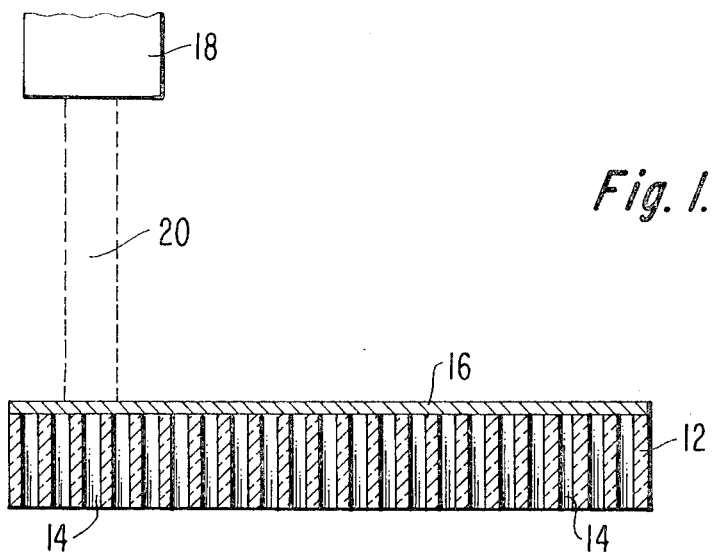
FIG. 1 illustrates a step in the present method for filling apertures with crystalline material.

Although the present method will be described in terms of the fabrication of a phosphorescent x-ray conversion screen, it is readily apparent that the method may be used in other situations where relatively small apertures are to be filled with crystalline material. With initial reference to FIG. 1, a sheet 12, of glass for example, has a plurality of small apertures 14 extending through the sheet. Each aperture 14 may be five or ten microns in diameter and 0.25 to 0.50 millimeters deep. One surface of the sheet 12 having the aperture openings is coated with a layer 16 of crystalline phosphorescent material which has a lower melting point than sheet 12. Conventional evaporation techniques may be employed to coat the sheet 12 with a crystalline layer. In the case of an x-ray conversion screen cesium iodide activated with sodium may be used as the phosphorescent material. The amount of phosphorescent material in the layer 16 is dependent upon the x-ray energy to be sensed and is approximately equal to the amount needed to fill the apertures 14.

A localized heat source, such as a laser 18 emitting a beam 20, is employed to heat a small portion of the phosphorescent layer 16 to at least its melting point. As used herein a localized heat source is a device capable of heating relatively small areas. For example the unfocused beam from a 10 watt $CO_2$ gas laser with an intensity regulating means, has been found to be adequate for the heating step. The phosphorescent material in the heated portion of the layer 16 is melted and allowed to flow into the apertures 14 beneath that portion. The heating step may be controlled by viewing the portion of the layer through a microscope and regulating the intensity of the laser beam 20 to provide the correct amount of heat to melt the phosphorescent material and permit it to flow into the apertures 14. The operator is able to observe the wetting of the glass sheet and the flowing of the phosphorescent material into the apertures. Once the apertures 14 have been filled with the phosphorescent material, the laser beam 20 is directed to an adjacent portion of the layer 16. This adjacent portion is then heated to melt the phosphorescent material and fill the apertures. After the laser beam 20 is moved, the filled apertures 14 in the previous portion cool and the phosphorescent material recrystallizes. The laser beam 20 is moved back and forth across the phosphorescent layer 16 scanning the entire surface of the layer until all of the apertures 14 are filled. Alternately, the laser 18 may be stationary and the sheet 12 moved back and forth to accomplish the scanning.

Figure 2:
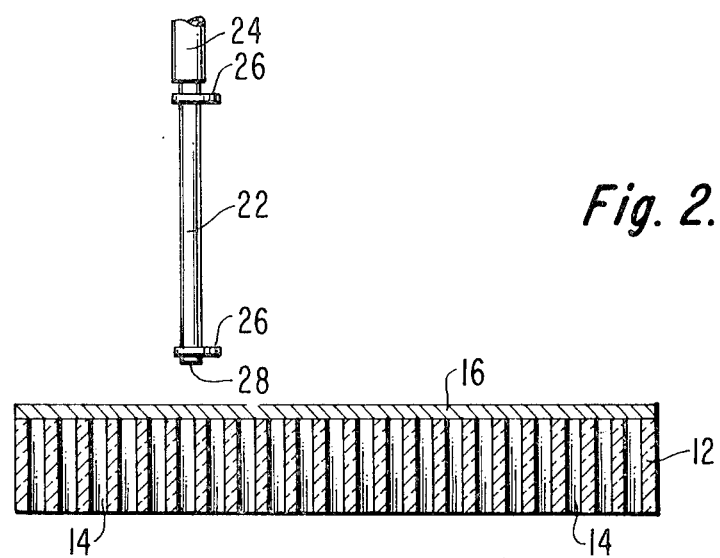
FIG. 2 illustrates the same step as FIG. 1 but employing a different apparatus.

A jet of hot inert gas, as shown in FIG. 2, may be used as another localized heat source. A small metal tube 22, may be connected via hose 24 to a source of an inert gas such as helium. The tube 22 may be made of pure platinum and have an internal diameter of 33 mils (about 838 microns). Electric terminals 26 are at each end of the tube 22. The electric terminals 26 are connected to a power supply (not shown) and a current is passed through the tube 22 to heat the tube to about 1,000° C. The inert gas is then passed through the tube 22 at a rate about 75cc per minute. The open end 28 of the tube 22 is then positioned near the surface of the phosphorescent layer 16. The heated gas flowing out of the open end 28 melts a small portion of the layer 16 which then flows into the apertures 14 below. The operator is able to control the process by observing the heating step and regulating the gas flow. The gas jet scans the surface of the layer 16 filling the apertures 14. Alternately, the gas jet remains stationary and the sheet 12 moved to provide the scanning. Alternately the gas jet may be replaced by an electron gun in an evacuated chamber. The electron beam from the gun melts the phosphorescent layer 16 in essentially the same manner as the jet of hot gas.

Figure 3:
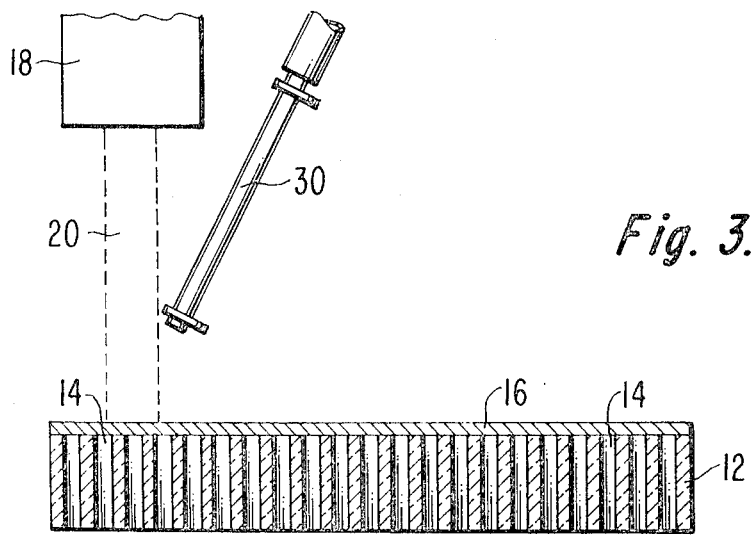
FIG. 3 illustrates the same step in the present method showing the combined use of the apparatus shown in FIGS. 1 and 2.

The laser shown in FIG. 1 and the gas jet shown in FIG. 2 heat the phosphorescent layer 16 in different ways. If the phosphorescent layer 16 is relatively transparent to the laser beam, the laser beam 20 passes right through the layer without heating it. However, the glass sheet 12 underneath the layer 16 is heated by the laser beam. It is actually the heat from the glass sheet 12 which melts the phosphorescent layer 16 by thermal conduction. In the case of the gas jet in FIG. 2, the hot gas striking the phosphorescent layer 16 directly heats the layer. The glass sheet 12 is heated by the hot phosphorescent layer 16. Since it is desirable for optimum recrystallization to minimize the temperature gradient within and between the phosphorescent layer 16 and the screen 12, it may be preferred to use a combination of the laser 18 and the hot gas jet 30 as shown in FIG. 3. The laser beam 20 and the hot gas jet are positioned so that they heat the same area of the phosphorescent layer 16 simultaneously as they scan the entire surface of the layer. In addition, the temperature gradient may be minimized in either of the three embodiments by employing another heater to bias heat the entire sheet 12 to a temperature less than the melting point of the phosphorescent material.

We claim:

1. A method for filling a plurality of tiny apertures in a sheet with a transparent crystalline material comprising:
    coating one surface of the sheet having aperture openings with a layer of the crystalline material;
    heating the layer with a localized heat source so that a portion of the layer melts and flows into some of the apertures;
    scanning the layer with the heat source so that the crystalline material flows into all of the apertures to be filled; and
    bias heating the entire sheet to a temperature below the melting point of the crystalline material during the heating and scanning steps so that the material in each aperture recrystallizes to form a transparent substantially single crystalline mass.

2. The method as in claim 1 wherein the heating of the layer is accomplished by directing a laser beam onto a portion of the layer.

3. The method as in claim 1 wherein the heating of the layer is accomplished by directing a jet of hot inert gas onto a portion of the layer.

4. The method as in claim 3 wherein the gas is heated to about 1000° C.

5. The method as in claim 1 wherein the heating of the layer is accomplished by both directing a laser beaom on a portion of the layer and directing a jet of hot inert gas against the same portion of the layer.

6. The method as in claim 1 wherein the heating of the layer is accomplished by directing an electron beam onto a portion of the layer.

7. The method as in claim 1 wherein the scanning is accomplished by moving the localized heat source with respect to the one surface of the sheet.

8. The method as in claim 1 wherein the scanning is accomplished by moving the sheet with respect to the localized heat source.

9. The method as in claim 1 wherein the coating comprises evaporating the layer onto the sheet.

* * * * *